US007949300B2

(12) United States Patent
Tan et al.

(10) Patent No.: US 7,949,300 B2

(45) Date of Patent: *May 24, 2011

(54) WIRELESS SHARING OF AUDIO FILES AND RELATED INFORMATION

(75) Inventors: Min-Liang Tan, Singapore (SG); Hoe Chan, Singapore (SG); Terence Tang, Singapore (SG)

(73) Assignee: Jook, Inc., Carlsbad, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 11/788,217

(22) Filed: Apr. 18, 2007

(65) Prior Publication Data

US 2008/0176511 A1 Jul. 24, 2008

Related U.S. Application Data

(63) Continuation-in-part of application No. 11/625,692, filed on Jan. 22, 2007, now Pat. No. 7,817,960.

(51) Int. Cl.
*H04B 7/15* (2006.01)
*H04K 3/00* (2006.01)

(52) U.S. Cl. ......... 455/11.1; 455/41.3; 381/79; 381/311

(58) Field of Classification Search ................. 455/11.1, 455/16–18, 41.2–41.3; 381/77, 79, 311
See application file for complete search history.

(56) References Cited

U.S. PATENT DOCUMENTS

| | | | | |
|---|---|---|---|---|
| 5,918,213 | A | 6/1999 | Bernard et al. | |
| 6,256,303 | B1 * | 7/2001 | Drakoulis et al. | 370/344 |
| 6,434,520 | B1 | 8/2002 | Kanevsky et al. | |
| 6,735,628 | B2 | 5/2004 | Eyal | |
| 6,915,176 | B2 | 7/2005 | Novelli | |
| 6,941,275 | B1 | 9/2005 | Swierczek | |
| 7,107,234 | B2 | 9/2006 | Deguchi | |
| 7,174,293 | B2 | 2/2007 | Kenyon | |
| 2002/0174431 | A1 | 11/2002 | Bowman et al. | |
| 2005/0060264 | A1 | 3/2005 | Schrock et al. | |
| 2006/0080258 | A1 | 4/2006 | Christal | |
| 2006/0101132 | A1 | 5/2006 | Arisawa et al. | |
| 2006/0235550 | A1 | 10/2006 | Csicsatka et al. | |
| 2007/0044010 | A1 | 2/2007 | Sull et al. | |
| 2007/0061215 | A1 | 3/2007 | Waites | |

FOREIGN PATENT DOCUMENTS

WO WO 2005026916(A2) 3/2005

OTHER PUBLICATIONS

Xenote iTag Named Overall 'Best of Show' At Upside's Showcase Conference PR Newswire Website: http://www.prnewswire.com/cgi-bin/stories.pl?ACCT=104&STORY=/www/story/Feb. 1, 2000.

Sony Device Bookmarks Music Heard on Radio CNET News.com; by Ian Fried; Published: Jun. 9, 2000; Website: http://news.com.com/2100-1040-241675.html.

* cited by examiner

*Primary Examiner* — Lee Nguyen

(74) *Attorney, Agent, or Firm* — Conley Rose, P.C.

(57) ABSTRACT

A system and method are disclosed for wireless sharing of audio sounds among a plurality of users. A user of the present invention can communicate his or her audio sounds to other users, who can receive the audio sounds wirelessly and choose to rebroadcast them. Along with the audio sound files users can share information regarding the audio sounds being shared, such as title, artist, collection, genre, year, encoding rate, size, playlist, and other desired information. The user of device can opt to set the device to transmit, re-transmit, broadcast, re-broadcast, receive or not to receive play-list information in addition to the audio sound files and the information regarding the audio sounds themselves.

49 Claims, 2 Drawing Sheets

WIRELESS SHARING OF AUDIO FILES AND RELATED INFORMATION

RELATED APPLICATION

This application is a continuation-in-part of application Ser. No. 11/625,692, filed Jan. 22, 2007, now U.S. Pat. No. 7,817 960 and claims the benefit thereof.

FIELD OF THE INVENTION

The present invention relates generally to the field of wireless communications, and more particularly to wireless communication of audio and related data among devices.

BACKGROUND OF THE INVENTION

Many prior art media devices can receive radio broadcasts from such sources such as FM, AM or satellite broadcasts. With respect to headphones, wireless headphones receive music from media devices via a variety of methods, such as infra-red transmission, 25 mhz radio or 2.4 ghz radio transmission technologies such as Bluetooth. Media devices can transfer media files such as music and/or video files wirelessly between other similar media devices via similar methods. The transferring of such files is usually from one storage medium to another.

Despite certain advantages of the foregoing, wired headphones and/or earbuds suffer from limitations. Some such systems allow one user to share the music experience by passing one wired headphone or earbud to a third party. This shared experience, however, does not allow the third party to experience the full stereo experience of the music. Headphone adapter jacks exist for two wired headphones to be connected to the same media device but this also requires both users to be tethered close to the same media device. Shared music by transfer of media files from one storage medium to other storage medium often infringes upon third party intellectual property rights.

Most prior art wireless headphones do not allow users to share music from the same media device such as an MP3 player. Wireless headphones are also limited to the range of the wireless transmitter—consequently, users using wireless headphones cannot be too far from the source. Also, general transmission techniques such as Bluetooth are generally accessible to anyone having the capability to receive that data.

Audio sound files (e.g., music, news broadcasts, podcasts, etc.) can of course be generated by a variety of devices such as a digital media player like the iPod®, a CD player or even a radio transmitting commercial radio broadcasts. Prior art teaching regarding sharing of such audio sounds received from such devices present is limited. A device which emits audio sounds can have two pairs of headphones tethered to the same device. Other devices may employ a wireless transmission of audio sounds, e.g. for a radio station, more than one person can listen to the radio broadcast by tuning their radio receiver to the proper radio frequency.

Most audio sound files in the popular MP3 and AAC formats contain identification information such as an ID3 tag. This information can contain a multitude of information including the name of the song, the music album it comes from, the artist behind it, the genre and even the year in which it was commercially released.

With prior art digital communications devices that communicate audio sounds, information about the audio sounds is shared in a very limited way, if at all. Although the audio sounds may be shared in some systems, the ID3 tag (or such similar tag) is usually not. It is difficult, and often impossible, for the recipient of the shared audio sounds to identify the name of the song and the artist behind the song. There is also no way of knowing what are the next song(s) and previous song(s) that are on the device's play-list, or the number of songs.

In addition, a person who is receiving the audio sound may want to purchase the same audio sounds from a retailer but is unable to do so as he or she does not know the information behind the audio sound, e.g. title, artist, album, etc. A person who is receiving audio sounds may also want to know more about the person who or the device which is sharing the audio sounds.

In view of the foregoing, a system and method are disclosed for wireless sharing of audio information and playlists among a plurality of users. The present invention is a method and system for enabling the sharing information on the following items:

(a) the information of shared audio sounds;
(b) play-lists information; and
(c) information on the device or the person using the device sharing the audio sounds.

The invention also encompasses a method and system to capture the information above. Potential advantages of the present invention include allowing users to share information where desirable.

SUMMARY OF THE INVENTION

A digital audio player is presented which features wireless stereo communication to other devices within the network. The device or system of devices incorporates components to transmit and receive audio sounds wirelessly (including by radio, Bluetooth or infra-red technologies) by: (a) having a transmitter/receiver built in (e.g., a wireless transmitter/receiver built into a portable computing device or a digital media player); (b) having an intermediary device that is used to implement the transmission/reception (e.g., a "dongle" transmitter/reception, or a transmitter/receiving station); (c) having the intermediary device that is used to implement the transmission/reception built into the headphones (wired or wireless); or (d) using a similar device or devices to implement the transmission/reception. The audio signal can be selectively rebroadcast to other users.

In addition, the user of the device can also opt to set the device to transmit, re-transmit, broadcast, re-broadcast, receive or not to receive information about the audio sounds in the same manner. The information on the audio sounds being shared can include information contained in the ID3 tag of digital audio sounds files, or in other such similar places and information that may be manually inserted by the user of the device. Some of that information may include: a) the title of the audio sound; b) the artist behind the audio sound; c) the writer of the audio sound; c) the album/collection the audio sound comes from; d) the genre of the audio sound; e) the year in which it was commercially released; f) the encoding rate of the audio sound if it is a digital media file; g) the size of the file if it is a digital media file; and h) other information about the audio sound.

Moreover, a method and system is disclosed wherein the user of device can opt to set the device to transmit, re-transmit, broadcast, re-broadcast, receive or not to receive play-list information in addition to the audio sounds and the information on the audio sounds themselves.

BRIEF DESCRIPTION OF THE DRAWINGS

The foregoing and other advantages of the invention will become apparent upon reading the following detailed description and upon reference to the drawings, wherein.

Figure 1:
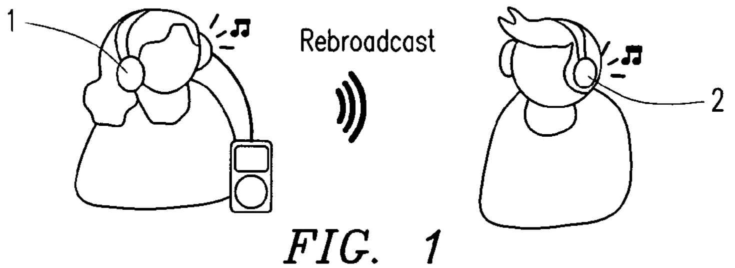
FIG. 1 illustrates a schematic view of a person sharing audio and related information in accordance with one aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As set forth above, embodiments of the invention provide a system and method for wirelessly sharing an audio experience among a plurality of users. The system contemplates a plurality of devices, any one of which is able to transmit to one or more other device. This allows one or more user of a device to receive the appropriate audio sounds from the transmitting device, thereby creating an audio sound sharing network. Alternatively, the users of any of the receiving devices can also opt to set their device to transmit while aforementioned users of the transmitting devices can also opt to set their devices receive.

Dedicated and Broadcast Use

As shown in FIG. 1, the user of a device 1 can opt to only transmit a dedicated signal from 1 to another device 2; in this instance, device 2 will be the only receiving device for 1. 2 decodes the signal from 1 to provide the user of 2 with the appropriate/desired audio sounds. As set forth below in further detail, in a preferred embodiment, related information about the audio files is shared as well.

As used herein, the term "dedicated" is used to refer to a closed network, whereby only users of that network may have ready access to the decoding and/or decrypting technology to access the communicated signals. A "closed network" can refer to a network that employs proprietary technology that is not directly interoperable with other standards-based networks, or that adds an additional layer of encoding onto standards-based networks. A "closed network" also encompasses a private network that can only be used by authenticated or authorized devices; e.g., outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Encryption may be utilized to encrypt data communicated between devices using communication encryption hardware or software to provide a further layer of security to the data communications. Encryption can be used to secure data communications and stored information. Digital communications accommodate the use of encryption. As consumers continue to move from wireline to wireless communications devices, the use of encryption has become more important to the end user in some contexts.

Figure 2:
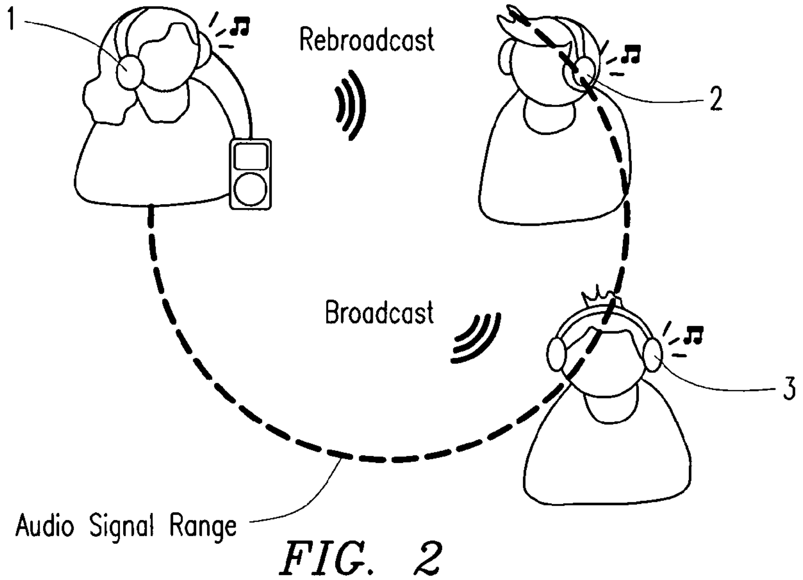
FIG. 2 illustrates a schematic view of a plurality of persons sharing audio (and data) from a single source in accordance with one aspect of the present invention.
Figure 3:
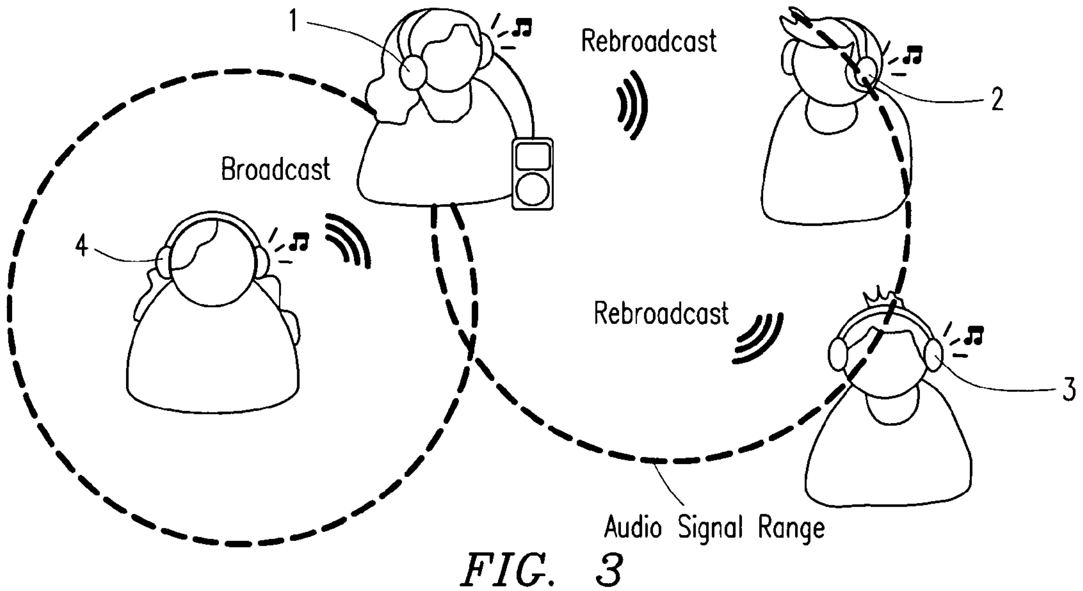
FIGS. 3 and 4 illustrate other embodiments of the invention in which a plurality of rebroadcasts occur.

Referring now to FIG. 2, a user of device 1 can opt to set 1 to broadcast. As such, enabled third parties in the range of transmission of 1, such as the user of a device 3 and potentially others, can opt to set their respective devices to receive from 1, or on a channel on which 1 is set to transmit. 3 and others can now decode the signal from 1 to provide the user of 3 and others with the appropriate/desired audio sounds. As shown in FIG. 3, the user of 1 can also opt to set 1 to receive from other transmitting devices (e.g., 4) belonging to other users.

Rebroadcasting

Figure 4:
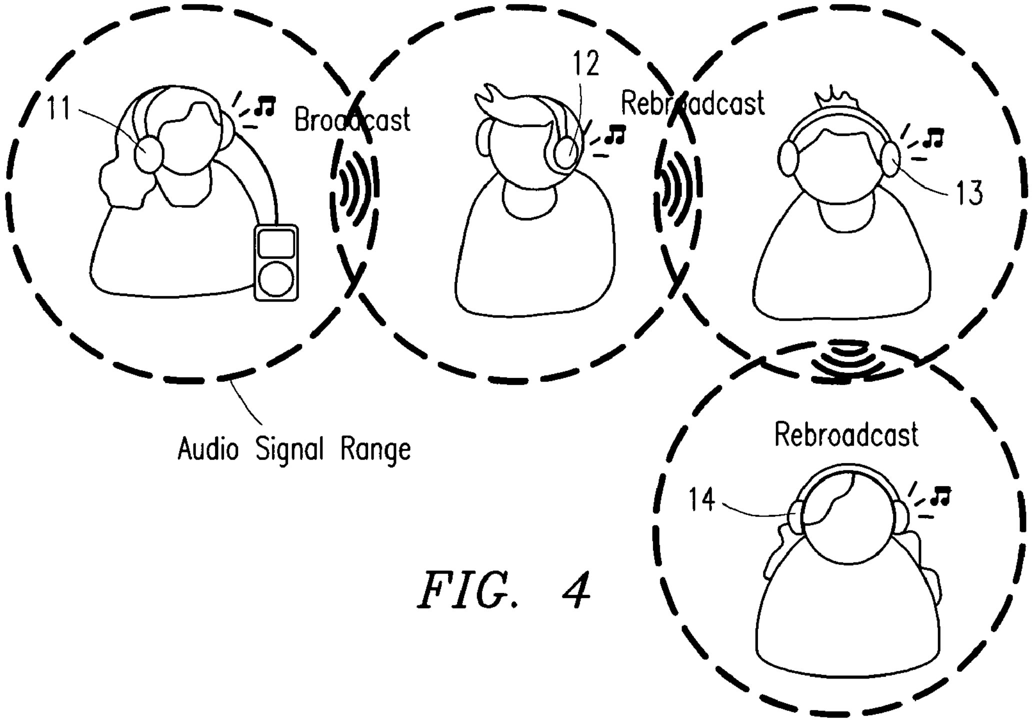

The system and method of the present invention can also be used in the context of re-broadcasting. For example, as shown in FIG. 4, with the user can set 11 on broadcast, the user of 12 which is receiving the audio sounds can opt to set 12 to receive the audio sounds from 11 and to simultaneously rebroadcast the same audio sounds to other users' devices (e.g., 13, 14, etc.). Rebroadcasting may be undertaken before or after decoding the signal; if the latter, the signal will be encoded prior to being retransmitted. The encoding may be the same as, or in some applications different from, the original encoding.

Rebroadcast thus allows user of 13 who is out of the range of 11 but in the range of the re-broadcast of 12 to receive the appropriate audio signals (and, as desired, related information) from 11, via 12. Likewise, if the user of 13 opts to set 13 to re-broadcast, the user of 14, who is out of the range of the broadcast of 11 and the re-broadcast of 12, can opt to set 14 to receive the appropriate audio sounds from 14 via 12 and 13. For all the applications above, the users of 12, 13 and 14 can also set their respective devices to receive the appropriate audio signals which are being re-broadcasted.

Figure 5:
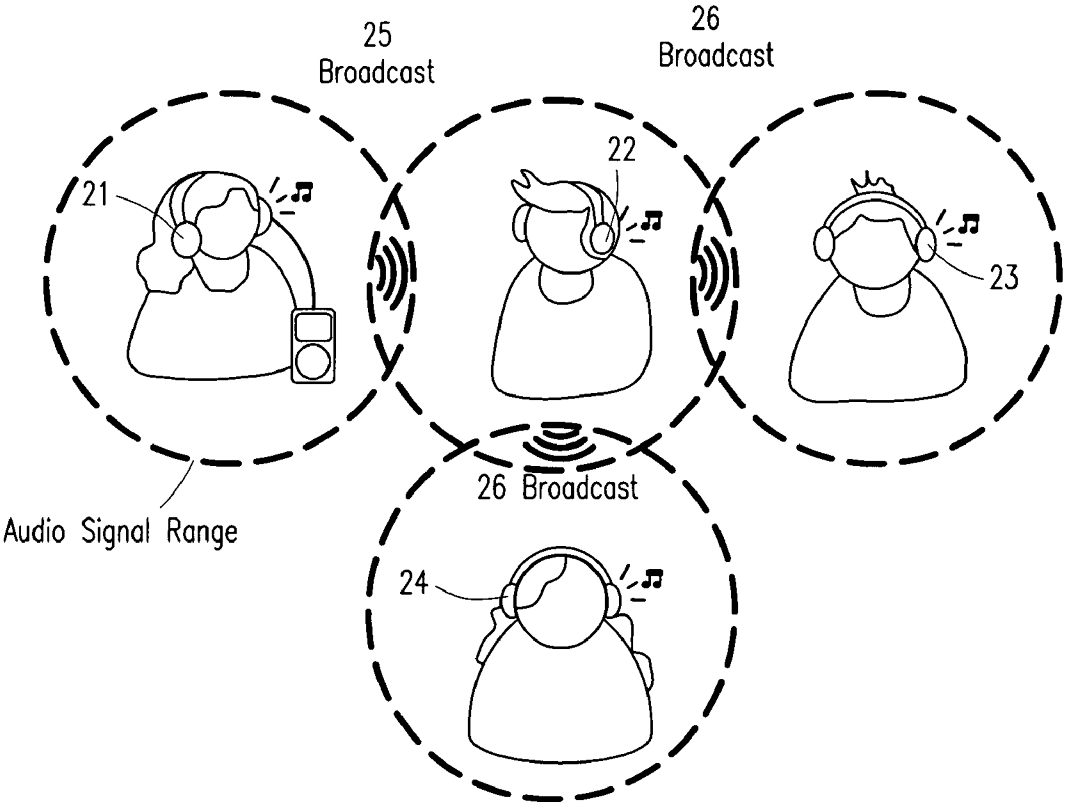
FIG. 5 illustrates another embodiment of the invention in which a plurality of broadcasts occur, and in which differing audio signals and related information may be communicated among the various devices.

FIG. 5 depicts an alternative embodiment of the invention that enables use with the simultaneous reception and transmission/broadcast of different audio sounds. As shown in FIG. 5, the user of 21 sets 21 to transmit or broadcast a certain audio signal 25. The user of 22 can set his device to receive the transmission/broadcast of AS1 from 21. The user of 22 can simultaneously opt to set 22 to transmit or broadcast a different audio sound 26 on a different channel which can be received by users of 23, 24, etc, provided that they have set their respective devices to receive the transmission or broadcast of 26 on that channel from the user of 22.

Embodiments of the present invention also enable use in multi-channel transmission or broadcast (simultaneous or otherwise). With multiple users transmitting in a limited range, the implementation of the wireless transmission may be made in dedicated channels which users may opt to receive either:

a) automatically via hunting and/or frequency hopping; or
b) manually by tuning to specific frequencies denoted by:
   i. discrete channels denoted by numbers (e.g., Channel 1, Channel 2, etc.);
   ii. discrete channels denoted with colors (e.g., Red, Green, Blue); or
   iii. other methods consistent with those known to persons of skill in the art.

In order to identify the mode in which a device is operating (transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:

a. visual cues, including text, colored indicators or lights, which will indicate the various modes in which the device is operating; and b. sound cues which will indicate the various modes in which the device is operating. Such sounds can either be heard audibly or through use of the device).

(e.g., 21 is set to broadcast. 21 flashes a blue light which users of other Devices (22, 23, etc.) can see and then opt to set 22, 23, etc. to receive 21's broadcast.)

Sharing of Related Digital Information

The user of the device can also opt to set the device to transmit, re-transmit, broadcast, re-broadcast, receive or not to receive information about the audio sounds themselves, the users, or the devices.

The information on the audio sounds being conveyed can include, but is not limited to, information contained in the ID3 tag of digital audio sounds files or in other such similar places and information that may be manually inserted by the user of the device. This information can include, though is not limited to:

a) The title of the audio sound;
b) The artist or group behind the audio sound;
c) The writer of a song;
d) The album or collection on which the audio sound can be found;
e) The genre of the audio sound;
f) The year in which it was commercially released;
g) The encoding rate of the audio sound if it is a digital media file;
h) The size of the file if it is a digital media file; and
i) Other desired information about the audio sound.

In a preferred embodiment, the user of device can opt to set the device to transmit, re-transmit, broadcast, re-broadcast, receive or not to receive play-list information in addition to the audio sounds and the information on the audio sounds themselves. Such information contained in the play-list includes but is not limited to:

a) Information on the next audio sound(s) to be played;
b) The previous audio sound(s) played;
c) The number of different audio sound(s) which will be played; and
d) Other information about the play-list.

Such information can be in a text form and users of the devices can opt to view the information on an associated display.

Further, this invention also claims a method and system where the recipient of the information relating to the audio sounds and/or play-lists can choose to capture and store the information of certain audio sounds as well as the play-list information at his or her option.

With this saved information, the recipient may then download this information to his personal computer or such other media device and the information of the audio sounds or play-list information which the recipient has captured will be downloaded to his computer or such other media device.

In on embodiment, this saved information is linked to online databases. Further information about the audio sounds or play-list information may be obtained in this manner through indexing and retrieval of additional information correlated to the originally saved data.

In a further embodiment, this device may also contain a unique identifier (be it a number or text or a combination of both or some other manner to uniquely identify the device), which may also be set by the user at his discretion.

Users of the device which transmit, re-transmit, broadcast, re-broadcast, receive or not receive audio sounds, information on the audio sounds and/or information on play-lists will be able to detect this unique identifier from other devices and similarly capture such information on the unique identifier, thereby enabling the user to identify the device from or to which it is sharing music and save this information for later.

In addition to this unique identifier, users of the device may also opt to transmit, re-transmit, broadcast, re-broadcast, receive or not to receive text, pictures or audio sounds, or a combination of these, which will be inserted by the user when the device is docked or sync-ed with a personal computer or through user inputs on the device itself.

Such captured information will be linked to a website or database (either online or not) of users of the device and with the captured information, the user will be able to navigate through such the website or database to find out more information about the user(s) whose device identifier had been captured.

The database may contain information about users of the device such as:

a) Name;
b) Address;
c) Music tastes;
d) Links to websites;
e) Photographs;
f) Blogs; and
g) other information disclosed by the user.

The advantage of this system of sharing is that in addition to creating wireless music sharing networks, a real community of people may also be fostered or built based on shared musical interests or merely by physical proximity which enable sharing and information exchange.

The foregoing discussion focuses principally on the sharing of music and other audio. It is understood, however, that other applications will also be useful. For example, the application could be used in a gaming environment, in which it is desired that a number of players share a similar audio experience. For example, all such members may be sharing a communications "channel" in the virtual environment. In addition, the present invention could be advantageously applied in the areas of education and training, among others.

As noted above, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A system for sharing an audible experience comprising:

a first audio playback system headphones comprising:

a plurality of speakers;

a first wireless transceiver, the first wireless transceiver configured to simultaneously receive reception signals and transmitting transmission signals; and a first control system for said first wireless transceiver adapted to control a transmission of a first audio signal and a first audio digital information to a second audio playback system headphones comprising a second wireless transceiver and a second control system adapted to generate an audio playback corresponding to said first audio signal and display said digital audio information.

2. The system of claim 1, wherein said first audio digital information comprises at least a portion of a first dataset from an ID3 tag data container accessible to said first control system.

3. The system of claim 2, wherein said first audio digital information comprises a second dataset, at least some of which is not available in an ID3 tag data container accessible to said first control system.

4. The system of claim 3, wherein said first audio digital information comprises a second dataset, wherein at least some of said second dataset is manually input by a user of said first audio playback system headphones.

5. The system of claim 1, wherein said first audio digital information comprises a title of said first audio signal.

6. The system of claim 1, wherein said first audio digital information comprises an artist associated with said first audio signal.

7. The system of claim 1, wherein said first audio digital information comprises a writer associated with said first audio signal.

8. The system of claim 1, wherein said first audio digital information comprises a collection associated with said first audio signal.

9. The system of claim 1, wherein said first audio digital information comprises a genre associated with said first audio signal.

10. The system of claim 1, wherein said first audio digital information comprises a date associated with a commercial release of said first audio signal.

11. The system of claim 1, wherein said first audio digital information comprises an encoding rate associated with said first audio signal.

12. The system of claim 1, wherein said first audio digital information comprises a size associated with said first audio signal.

13. The system of claim 1, wherein said first audio digital information comprises a playlist associated with said first control system.

14. The system of claim 1, wherein said first audio digital information comprises a playlist associated with said first control system.

15. The system of claim 1, further comprising storing at least some of said first digital audio information for later download.

16. An audio sharing network comprising:

a first playback system comprising:

a first wireless transceiver, the first wireless transceiver configured to simultaneously receive reception signals and transmitting transmission signals; and a first control system for said first wireless transceiver adapted to control simultaneous reception and transmission of a first audio signal and a first dataset associated with said first audio signal; and a second playback system comprising:

a second wireless transceiver; and a second control system for said second wireless transceiver adapted to control reception and playback of said first audio signal and display of at least some of said first dataset.

17. The network of claim 16, wherein said second control system is adapted to allow a user to rebroadcast said first audio signal and said first dataset to a third playback system.

18. The network of claim 16, wherein said first audio signal and said first dataset are encoded, thereby creating a closed network.

19. The network of claim 16, wherein said first audio signal and said first dataset are encrypted before transmission, thereby generating a first encrypted audio signal and a first encrypted dataset.

20. A device peripheral comprising:

a controller;

a transceiver controllable by the controller for performing a signaling operation, the signaling operation comprises simultaneously receiving reception signals and transmitting transmission signals;

a device interface couplable to a device for communicating the controller with the device, the controller for performing a communication operation via the device interface, the communication operation comprises simultaneously receiving first dataset from and transmitting second dataset to the device, each of the first and second dataset comprises at least a media data and digital information, wherein the reception signals carrying and being convertible into one of a third dataset and the first dataset, and the transmission signals carrying and being converted from one of the first dataset, the second dataset, the third dataset and a fourth dataset, wherein each of the first dataset, the second dataset, the third dataset and the fourth dataset comprises at least one of a media data and digital information being at least one of indicative and descriptive of the media data, the media data comprising at least one of video data, image data and audio data.

21. The device peripheral of claim 20, wherein the second dataset is derived from the first dataset.

22. The device peripheral of claim 20, further comprises a user interface for displaying the digital information.

23. The device peripheral of claim 20, wherein the digital information comprises a title of the media data.

24. The device peripheral of claim 20, wherein the digital information comprises an artist associated with the media data.

25. The device peripheral of claim 20, wherein the digital information comprises a writer associated with the media data.

26. The device peripheral of claim 20, wherein the digital information comprises a collection associated with the media data.

27. The device peripheral of claim 20, wherein the digital information comprises a genre associated with the media data.

28. The device peripheral of claim 20, wherein the digital information comprises a date associated with a commercial release of the media data.

29. The device peripheral of claim 20, wherein the digital information comprises an encoding rate associated with the media data.

30. The device peripheral of claim 20, wherein the digital information comprises a size associated with the media data.

31. The device peripheral of claim 20, wherein the digital information comprises a playlist associated with the media data.

32. The device peripheral of claim 20, further comprising storing at least some of the information for later download.

33. A device comprising:

a controller;

a transceiver controllable by the controller for performing a signaling operation, the signaling operation comprises simultaneously receiving reception signals and transmitting transmission signals;

a playback module; and a data interface for communicating the controller with the playback module, the controller for performing a communication operation via the data interface, the communication operation comprises simultaneously receiving first dataset from and transmitting second dataset to the device, the playback module being operable for playback of one of the first dataset and the second dataset, wherein the reception signals carrying and being convertible into one of a third dataset and the first dataset, and the transmission signals carrying and being converted from one of the first dataset, the second dataset, the third dataset and a fourth dataset, wherein each of the first dataset, the second dataset, the third dataset and the fourth dataset comprises at least one of a media data and digital information being at least one of indicative and descriptive of the media data, the media data comprising at least one of video data, image data and audio data.

34. The device of claim 33, wherein the second dataset is derived from the first dataset.

35. The device of claim 33, further comprises a user interface for displaying the digital information.

36. The device of claim 33, wherein the digital information comprises a title of the media data.

37. The device of claim 33, wherein the digital information comprises an artist associated with the media data.

38. The device of claim 33, wherein the digital information comprises a writer associated with the media data.

39. The device peripheral of claim 33, wherein the digital information comprises a collection associated with the media data.

40. The device of claim 33, wherein the digital information comprises a genre associated with the media data.

41. The device of claim 33, wherein the digital information comprises a date associated with a commercial release of the media data.

42. The device of claim 33, wherein the digital information comprises an encoding rate associated with the media data.

43. The device of claim 33, wherein the digital information comprises a size associated with the media data.

44. The device of claim 33, wherein the digital information comprises a playlist associated with the media data.

45. The device of claim 33, further comprising storing at least some of the information for later download.

46. The device peripheral of claim 20, wherein the signaling operation further comprises one of receiving the reception signals and transmitting the transmission signals.

47. The device peripheral of claim 20, wherein the communication operation further comprises one of transmitting the first dataset to the device and receiving the second dataset from the device.

48. The device, of claim 33, wherein the signaling operation further comprises one of receiving the reception signals and transmitting the transmission signals.

49. The device of claim 33, wherein the communication operation further comprises one of transmitting the first dataset to at least one other device and receiving the second dataset from the at least one other device.

* * * * *